United States Patent

O'Rourke et al.

[11] Patent Number: 5,367,986
[45] Date of Patent: Nov. 29, 1994

[54] CHEW TOY FOR DOGS

[75] Inventors: Anthony O'Rourke, Malibu; M. William Perel, Beverly Hills, both of Calif.; Kimberley Ammons, Ben Wheeler, Tex.

[73] Assignee: Booda Products, Inc., Gardena, Calif.

[21] Appl. No.: 110,152

[22] Filed: Aug. 20, 1993

[51] Int. Cl.⁵ ............................................. A01K 15/00
[52] U.S. Cl. .................................. 119/709; D30/160; 446/385
[58] Field of Search ............... 119/707, 708, 709, 710, 119/711; 446/268, 327, 328, 385; D30/160, 199

[56] References Cited

U.S. PATENT DOCUMENTS

| | | | |
|---|---|---|---|
| 3,722,070 | 3/1973 | Shiner | 446/385 |
| 4,321,888 | 3/1982 | Topliffe | 119/709 |
| 4,770,123 | 9/1988 | Bell | 119/709 |
| 4,884,807 | 12/1989 | Welch | 119/707 |
| 4,924,811 | 5/1990 | Axelrod | 119/710 |
| 5,033,410 | 7/1991 | Sigurdsson | 119/710 |
| 5,074,249 | 12/1991 | McMahon | 119/709 |
| 5,092,272 | 3/1992 | O'Rourke | 119/709 |

*Primary Examiner*—Gene Mancene
*Assistant Examiner*—Todd E. Manahan
*Attorney, Agent, or Firm*—Lyon & Lyon

[57] ABSTRACT

A chew toy for dogs comprises a plurality of threads of soft pliable material having a knot tightly formed therein and a skirt of a soft durable material disposed about a portion of the threads. The skirt is secured within the knot with the threads disposed throughout the skirt and projecting therefrom. The skirt is closed about the threads so as to secure the threads in place within the skirt. A second portion of the threads projects from the knot on a side thereof opposite from the skirt.

1 Claim, 2 Drawing Sheets

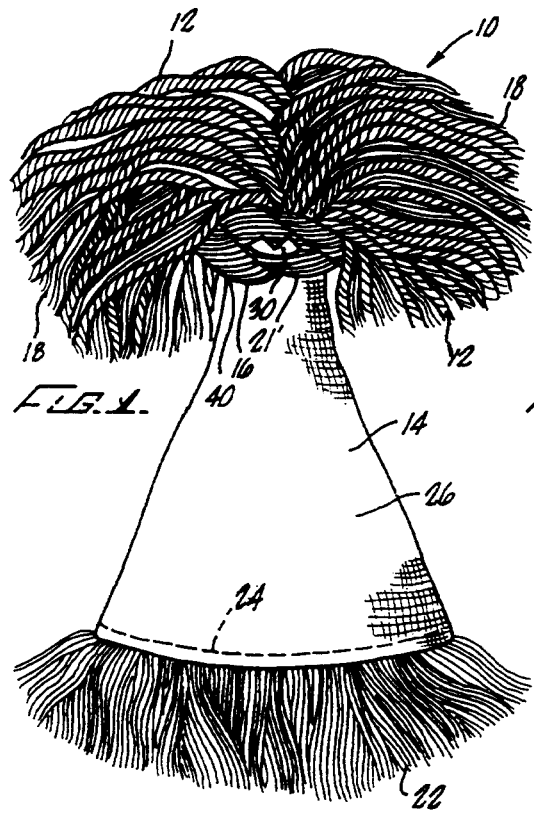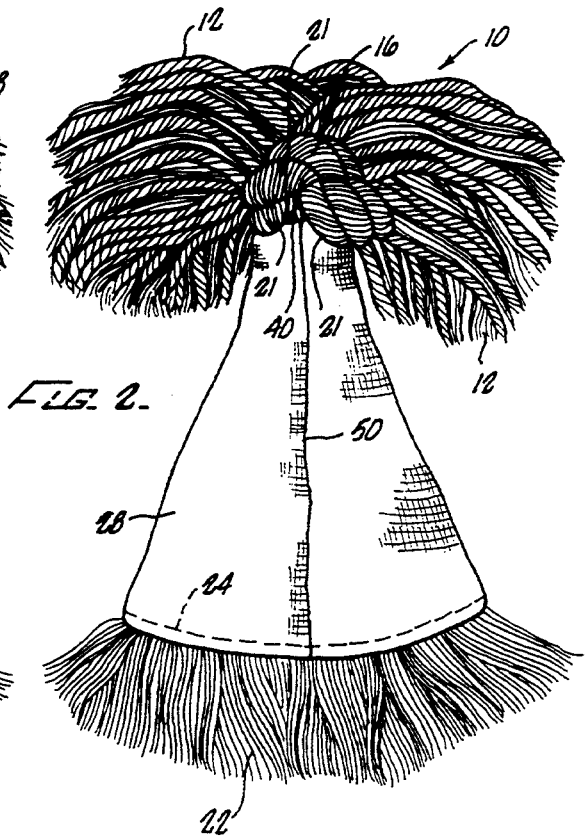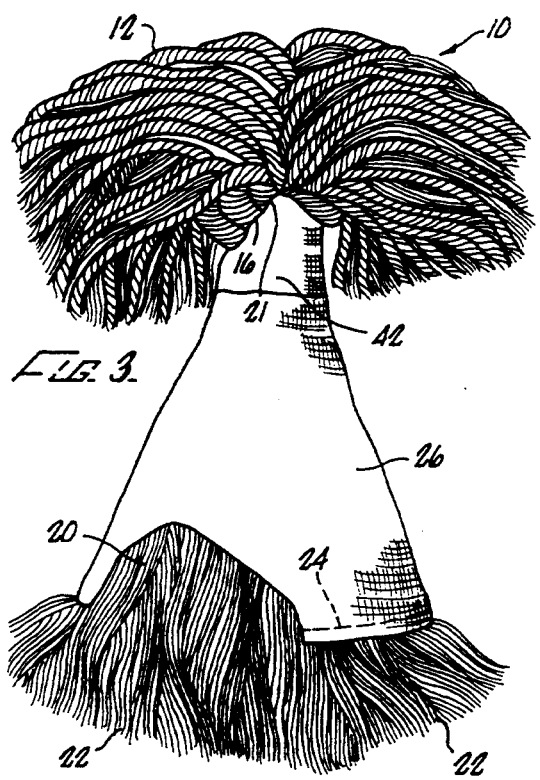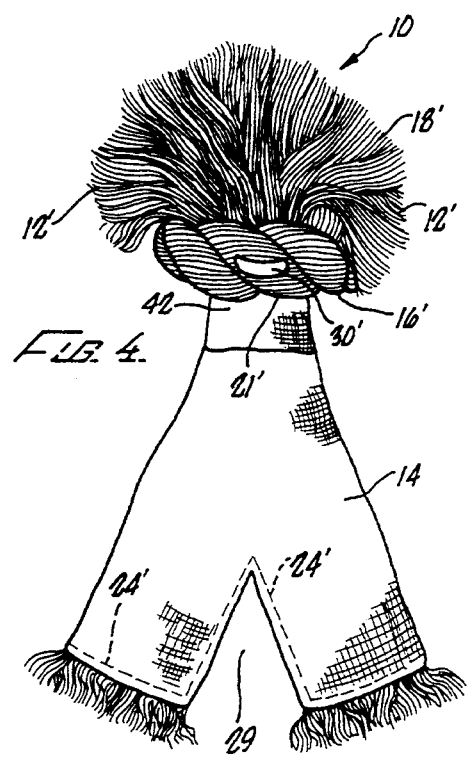

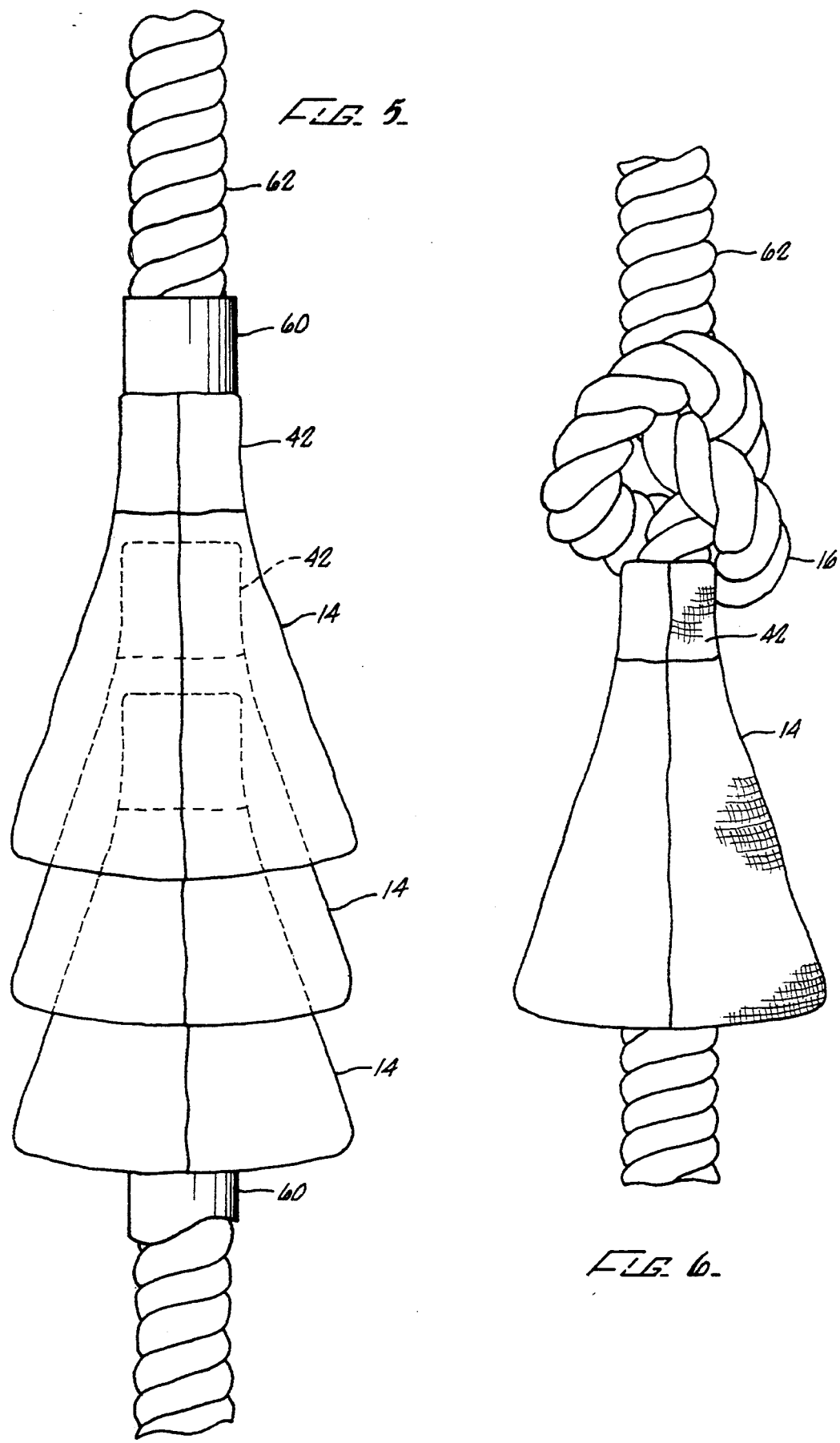

CHEW TOY FOR DOGS

BACKGROUND OF THE INVENTION

The present invention relates to a novel chew toy for dogs. Dog chew toys are well-known and embody numerous different configurations and materials. One of the more popular of such toys was previously developed by applicant, Booda Products, Inc., and comprises a short length of cotton rope having large knots near the ends thereof so as to resemble a classic dog bone configuration. The soft cotton rope provides a brushing effect and flossing of the dog's teeth and a gentle massaging of its gums when chewed and thus provides therapeutic benefits as well as playful enjoyment for the dog. While such cotton rope bone chew toys have enjoyed widespread success and are considerably more durable than rawhide chew toys and the like, some large dogs can chew through the shaft portion of the cotton bones. If this were to occur, the attractiveness of the toy to a dog would be significantly reduced. A dog could no longer engage in the playful tossing of the toy back and forth about its head, nor readily hold the bone upright in its paws to gnaw on one of its knotted ends as dogs are prone to do. Thus, the severing of a cotton rope bone generally results in a loss of interest in the toy by the dog. Because a knotted cotton rope chew toy provides a dog with definite therapeutic benefits, it would be desirable to provide a dog chew toy which retained these benefits but which was less susceptible to being severed when chewed vigorously by large powerful dogs. The chew toy of the present invention achieves this objective.

In addition to chewing and playing with dog chew toys, many dogs also appear to enjoy mouthing soft pliable items. Such activity, when not destructively channeled to an owner's clothing, is not only harmless but soothing to the dog and beneficial to its gums. The chew toy of the present invention not only retains beneficial attributes of cotton rope chew toys while enhancing their durability, it also provides a soft pliable texture over a substantial portion of its length which is ideally suited for dogs which enjoy mouthing or gumming as well as chewing on their toys.

A number of veterinarians believe that some dogs perceive humanoid figures differently from bone configurations and as a result, certain dogs, particularly smaller dogs, will play with a humanoid doll figure differently and for longer periods of time than with a chew bone. Many dogs will carry a doll toy about similar to a child playing with a doll. In addition to the therapeutic benefits from chewing on the toy of the present invention, the toy also defines a doll configuration. Such a configuration provides the chew toy with an appearance which is more attractive to pet owners than conventional chew toys and may additionally be more beneficial to some dogs.

SUMMARY OF THE INVENTION

Briefly, the present invention is directed to a chew toy for dogs comprised of a length of rope formed of skeins of cotton or other soft pliable threads having a knot tightly formed therein about the upper end of a relatively flat substantially frustoconically-shaped skirt of denim or other relatively soft yet highly durable material so as to lock the skirt to the rope such that the cotton knot is disposed adjacent the upper end of the skirt and the rope passes through the skirt and projects therefrom. The frayed end of the rope projecting upwardly from the knot above the skirt is combed and cut to a first length so as to resemble hair growing from a head defined by the knot. The skeins of threads projecting downwardly from the knot through the skirt are spread evenly within the skirt, combed and cut to a second length substantially longer than the first length such that they project a short distance from the underside of the skirt. The front and rear sides of the skirt are then sewed together adjacent the lower open end thereof to close the skirt about the cotton threads projecting therethrough and fix the threads in place relative to the skirt. The resultant chew toy is thus provided with a female appearance. Alternatively, an inverted V-shaped slit is cut in the lower end of the skirt such that the skirt is given a trouser appearance and, upon sewing together the lower ends of the split skirt, the resultant toy presents a male appearance.

As a result of the aforesaid configuration, not only do the cotton rope and denim skirt present a unique configuration for a dog chew toy, the cotton rope knot and cotton threads projecting upwardly therefrom and downwardly from the denim skirt provide a cleaning and flossing of the dog's teeth and a soft massaging of its gums when chewed. The combed cotton threads uniformly distributed and secured within the sealed skirt of denim material provides the toy with a body portion which is soft in texture so as be pleasing to the dog's gums, sufficiently pliable so that the dog can toss the toy from side to side about its head during play, yet sufficiently rigid such that the body portion of the toy can be easily held between the dog's paws to elevate the knot on the toy so that it can be easily chewed by the dog, promoting jaw development. In addition, the soft threads securely encased within the durable denim material and the physical interlock between the skirt and the knot provide a body portion for the toy which is highly resistant to be torn apart upon being chewed by a dog.

It is therefore the principal object of the present invention to provide a chew toy for dogs which retains the therapeutic benefits of cotton rope bone chew toys while enhancing the durability thereof.

It is another object of the present invention to provide a chew toy for dogs which has a soft pliable texture over at least a substantial portion thereof yet is sufficiently rigid so as to be readily held between a dog's paws in an upright position so as to enable the dog to easily gnaw on one end thereof.

It is a further object of the present invention to provide a chew toy for dogs which is configured like a doll yet sufficiently durable so as to be highly resistant to being torn apart upon being vigorously chewed by a dog.

These and other objects and advantages of the present invention will become readily apparent from the following detailed description taken in conjunction with the accompanying drawings.

DESCRIPTION OF THE PREFERRED EMBODIMENT IN THE DRAWINGS

FIG. 1 is a frontal plan view of the chew toy of the present invention.

FIG. 2 is a rear view of the chew toy of the present invention.

FIG. 3 is a frontal plan view of the chew toy of the present invention with a modified skirt construction and portions of the knot and skirt broken away.

FIG. 4 is a frontal plan view of an alternate configuration of the chew toy of the present invention.

FIG. 5 is a schematic representation of a portion of the process for forming the chew toy of the present invention.

FIG. 6 is a schematic representation illustrating the method of securing the skirt portion of the toy to the rope portion thereof.

Referring now in detail to the drawings, the chew 10 of the present invention is comprised of a plurality of threads 12 of a soft pliable material such as cotton and a skirt 14 of a soft yet durable material such as denim. Threads 12 collectively define a relatively large knot 16 and individually define upper portions 18 which project upwardly from knot 16, intermediary portions 20 disposed within skirt 14 and lower portions 22 which project from skirt 14.

The upper portions 18 of threads 12 are defined by unraveled and combed skeins 21 of which the knot 16 is formed. The intermediary portions 20 and lower portions 22 of threads 12 are also defined by the unraveled and combed skeins 21. The intermediary portions 20 are evenly distributed throughout the interiors of skirt 14 by a combing process and held in place by a double stitched seam 24 which secures together the lower ends 26' and 28' of the front side 26 and backside 28 of skirt 14. A heat transfer 30 defining a pair of lips is preferably secured to the skein 21' centrally disposed on knot 16 so as to be substantially aligned with the central axis of skirt 14 such that the resultant toy configuration presents a female doll appearance.

A modified form of the toy 10 is illustrated in FIG. 4 wherein an inverted V-shaped notch 29 is cut in the bottom portion of the skirt 14 so that upon sewing the front side and back side of the skirt together as above described along seam 24', a trouser effect is created. In this embodiment of chew toy 10, the upper portions 18' of thread 12' are cut shorter so as to give the appearance of a more typical male haircut. Again, a heat transfer 31' in the form of lips is secured to the centrally disposed skein 21' of knot 16'.

It is important in the construction of chew toy 10 to physically lock skirt 14 to threads 12 in a manner such that the skirt 14 cannot be separated from threads 12 when the toy is chewed by a dog. This is accomplished in the present invention by forming knot 16 very tightly about the upper end 40 of skirt 14 as illustrated in FIG. 3 wherein a portion of the knot 16 is broken away to illustrate the formation of the knot about the upper end 40 of the skirt 14. Thus, the skirt 14 is held to the thread 12 by means of the double stitched seam 24 at the lower end of the skirt and the tying of knots 16 tightly about the upper end of the skirt. As a result of such construction, a highly durable yet soft body portion is defined for chew toy 10 by means of the encasement and securement of the combed threads 12 within the denim skirt 14.

As a result of the tight securement of the upper end of skirt 14 within knot 16, there is a tendency for the upper portion of skirt 14 proximate the underside of knot 16 to bunch together slightly and thus distract from the ornamental appearance of the toy. While this bunching can be minimized with careful and deliberate construction procedures, such procedures may prove time consuming and unduly costly. By providing the upper end of skirt 14 with a substantial cylindrical collar portion 42 as seen in FIGS. 3 and 4, the tendency of the upper portion of the skirt to bunch together below knot 16 is prevented. As the knot 16 is formed tightly about collar 42, the collar may be slightly deformed but the skirt retains its substantially uniform appearance. Collar 14 is formed by sewing a rectangular strip of denim material to the upper end of the pattern from which the relatively flat frustoconical skirt 14 is formed. When the formation of skirt 14 is completed by closing the skirt along centrally disposed vertical seam 50 and knots 16 tightened about collar 42, the desired skirt configuration is obtained without altering the ornamental appearance which would otherwise be obtained by skirt 14 without the use of collar 42. If desired, collar 42, could be formed of a differently colored denim material to provide a visible collar configuration to the skirt 14.

While various processes could be employed in forming the chew toy 10 of the present invention, FIGS. 5 and 6 schematically illustrate an innovative method for mass producing toy 10 for commercial production. The first step in producing chew toy 10 of the present invention is construct a plurality of denim skirts 14. While this step is not shown, a conventional seamstress approach is simply employed. A plurality of patterns are cut from the denim material such that upon sewing the ends thereof together along central seam 50 the desired relatively flat frustoconical skirt configuration would be defined. To prevent bunching of the skirt in a mass production process, a rectangular strip of denim material would be first sewn onto the cut pattern so as to provide the collar therefor. The pattern would then be sewn together along its longitudinal seam to provide the desired skirt configuration.

In the process illustrated in FIGS. 5 and 6, a plurality of formed skirts 14 are slided onto a thin walled plastic tube member 60 as shown in FIG. 5. While three such skirts are shown therein, in actual production a greater number of such skirts would be mounted on each tube. The tube 60 is sized of a particular diameter to correspond with the diameter rope used to form the toy and thus provides a quality control means for verifying the upper diameter of the formed skirt 14. Tube 60 also defines a cartridge loading system for placing the skirts onto the rope in mass production of the toy 10. After a tube has been loaded with the desired plurality of formed skirts, a length of cotton rope 62 is inserted therethrough. A first knot 16 is then relatively loosely formed in the rope 62 above tube 60 and the uppermost skirt on tube 60 is slided off the tube and onto the rope below the partially formed knot 16 as seen in FIG. 6. The skirt is then slided to the knot such that the collar 42 (or upper end of the skirt if a collar is not used) is inserted into the knot and the knot tightened about the collar 42 locking the skirt to the rope.

It is important to tightly form the knot 16 about the upper portion of the skirt so the that skirt cannot be pulled therefrom when the formed toy is chewed by a dog. To this end, a knot tightening device employing a mechanical advantage should be employed. A typical such device employs a vice means for holding the rope and a pivotally mounted apertured lever through which the rope extends so as position the knot to be tightened on the opposite side of the lever from the vice means. As the lever is pivoted from the vice means, the knot is secured extremely tightly about the upper end of the skirt.

After the first skirt is secured within the knot 16, a second knot is formed spaced below the first skirt and the next skirt in line on the tube 60 is slided into the formed knot whereupon the second knot is tightened about the second skirt. The process is then repeated until all the skirts 16 originally loaded on tube 60 are periodically held within the spaced knots along the rope. The rope is then severed about of each knot and skirt. The skeins defining the rope above and below each knot are separated and combed out with the intermediary portions 20 of threads 12 being combed so as to be equally distributed throughout the interior of the skirt. It may be desirable not to complete the vertical closure seam 50 until after the combing of the threads below knot 16 to provide better access to the threads within the skirt. In such a case, only the upper portion of seam 50 would be closed prior to loading the skirts onto tube 60. The skirt is then sewn together about its lower end and the excess threads below the end of the skirt trimmed to the desired length. The lips are then applied by heat stamping to the knot and any desired decorative heat transfers (not shown) can be applied to the denim material forming the female skirt configuration of FIG. 1 or the trouser configuration of FIG. 4.

Various modifications can be made in carrying out the present invention without departing from the spirit and scope thereof. Insofar as these changes and modifications are within the purview of the appended claims, they are to be considered as part of the present invention.

We claim:

1. A chew toy for dogs comprising a plurality of threads of a soft pliable material having a knot tightly formed therein and a skirt of a soft durable material disposed about a portion of said threads, a portion of said skirt being secured within said knot, said portion of said threads being disposed throughout said skirt and projecting therefrom, means for closing said skirt about said threads so as to secure said portions of said threads in place within said skirt, and wherein a second portion of said threads projects from said knot on a side thereof opposite from said skirt.

* * * * *